(12) United States Patent
Schonebeck

(10) Patent No.: US 6,977,019 B2
(45) Date of Patent: Dec. 20, 2005

(54) METHOD OF PRODUCING A VEHICLE INTERIOR LINING AND VEHICLE INTERIOR LINING

(75) Inventor: Horst Schonebeck, Gelnhausen (DE)

(73) Assignee: ArvinMeritor, GmbH, (DE)

(*) Notice: Subject to any disclaimer, the term of this patent is extended or adjusted under 35 U.S.C. 154(b) by 0 days.

(21) Appl. No.: 10/643,782

(22) Filed: Aug. 19, 2003

(65) Prior Publication Data
US 2004/0076814 A1 Apr. 22, 2004

(30) Foreign Application Priority Data
Aug. 19, 2002 (DE) .............. 102 37 836

(51) Int. Cl.[7] .............. B32B 5/20; B32B 5/32; B32B 31/12
(52) U.S. Cl. .............. 156/79; 156/78; 264/259
(58) Field of Search .............. 156/78, 79

(56) References Cited

U.S. PATENT DOCUMENTS

| | | | | |
|---|---|---|---|---|
| 3,620,906 A | * | 11/1971 | Hannes | 428/339 |
| 4,062,711 A | * | 12/1977 | Davis | 156/244.25 |
| 5,230,855 A | * | 7/1993 | Kargarzadeh et al. | 264/301 |
| 6,204,209 B1 | * | 3/2001 | Rozek et al. | 442/374 |
| 6,499,797 B1 | * | 12/2002 | Böhm et al. | 296/191 |

FOREIGN PATENT DOCUMENTS

| | | | | |
|---|---|---|---|---|
| DE | 3206468 A | | 9/1983 | |
| DE | 3430775 A1 | | 3/1986 | |
| DE | 4130130 A1 | * | 3/1993 | B28B 11/04 |
| GB | 1335098 A | | 10/1973 | |
| JP | 53059780 A | * | 5/1978 | B32B 5/18 |
| JP | 56086719 A | * | 7/1981 | B29D 3/02 |
| WO | WO 8001892 A | | 9/1980 | |

OTHER PUBLICATIONS

European Search Report.

* cited by examiner

Primary Examiner—Sam Chuan Yao
(74) Attorney, Agent, or Firm—Carlson, Gaskey & Olds

(57) ABSTRACT

A vehicle interior lining having good sound absorbing properties and that is permeable to air is formed from an intermediate product comprising an inside decorative layer and a barrier layer made of open-cell foam. The barrier layer adjoins the rear side of the decorative layer. A foam backing is disposed on the rear side of the intermediate product is provided with a foam backing. The barrier layer prevents the foam backing material from penetrating through toward the decorative layer, eliminating the need for a barrier film and improving sound absorption. The interior lining can be used as a roof lining.

19 Claims, 1 Drawing Sheet

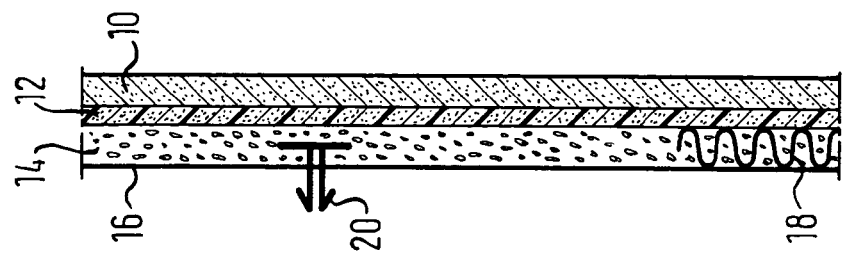
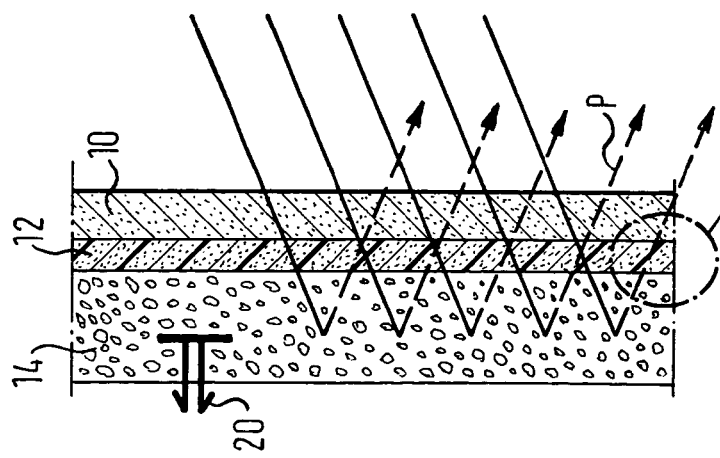

METHOD OF PRODUCING A VEHICLE INTERIOR LINING AND VEHICLE INTERIOR LINING

REFERENCE TO RELATED APPLICATION

The present invention claims the benefit of German Patent Application No. 102 37 836.3, filed Aug. 19, 2002.

TECHNICAL FIELD

The invention relates to a method of producing a vehicle interior lining, in particular a roof lining. The invention further relates to a vehicle interior lining produced by the method according to the invention.

BACKGROUND OF THE INVENTION

Currently known vehicle interior linings are often produced with a decorative layer, in particular a textile, laminated on the rear side by applying a soft plastic layer. This is intended to impart a so-called soft touch to the vehicle interior lining, i.e. haptics of higher quality. A so-called barrier film is glued to the soft layer on the rear side thereof. The intermediate product thus produced is then provided with a foam backing of polyurethane (PU) material, with the barrier film preventing liquid PU material from penetrating into the soft plastic layer and the textile layer and becoming visible from outside. Increasingly higher demands are made on vehicle interior linings, particularly with respect to sound absorption.

However, sound can partially be reflected by the barrier film, reducing sound absorption.

German Patent DE 34 30 775 shows a sound-absorbing carpet which can be used in motor vehicles and has a layer made of open-cell plastic. The open-cell layer, however, is not realized as a barrier layer. Rather, a so-called heavy layer adjoins the layer of open-cell foam and is to take over the barrier function.

There is a desire for a vehicle interior lining structure having a layer that can block liquid plastic used to form the foam backing and enhance sound absorption.

SUMMARY OF THE INVENTION

The invention provides a method of producing a vehicle interior lining, which can be manufactured in a very easy manner. Moreover, the vehicle interior lining according to the invention is distinguished by a simple structure, an enhanced sound absorption ability as well as air permeability. Further, the quality appearance is at least equal to that of a vehicle interior lining according to the above mentioned prior art.

The method according to one embodiment of the invention is characterized by the following steps:

a) producing an intermediate product of an inside decorative layer and a barrier layer made of open-cell foam, the barrier layer preferably directly adjoining the rear side of the decorative layer, b) providing the rear side of the intermediate product with a foam backing.

The barrier layer is formed such that a plastic applied to the barrier layer during back foaming does not penetrate the barrier layer toward the decorative layer.

With the inventive method, the barrier film is completely omitted so that any sound can penetrate as far as into the thick layer, which is produced by back foaming. Thus, the lining piece has an enlarged sound absorption ability. The barrier effect is accomplished by the barrier layer, which is made of open-cell plastic. Thus, the barrier layer has a dual function; it is soft and gives the vehicle interior lining the desired soft touch, and it prevents the liquid plastic material from seeping through to the decorative layer. A soft intermediate layer between the "hard" decorative material and the barrier layer is omitted without substitution.

Connecting the decorative layer to the barrier layer can be done, for instance, by gluing the two layers to each other.

According one embodiment of the invention, the intermediate product can be produced by a lamination process.

In one embodiment, a fiber mat, such as a glass fiber mat or a natural fiber mat, can be embedded in the back foamed layer and on the rear side thereof during a back foaming process. It is also possible to apply the fiber mat to the rear side of the back foamed layer with the possibility of fastening the lining piece to the vehicle through the fiber mat.

PU (polyurethane) material is preferably used for the foam backing.

Textile fabric and imitation leather may be used as decorative layer. Note that imitation leather, however, is made to be permeable to air, which would lead to the risk of the liquid PU material becoming visible on the front side, namely towards the vehicle interior space, when having contact with the rear side thereof. The imitation leather preferably is a perforated smooth leather or an artificial suede.

As already mentioned, the invention further relates to a vehicle interior lining, in particular a roof lining produced by the method according to the invention, and to a layer structure which, starting from the inside of the vehicle, is comprised of a decorative layer, a barrier layer which is made of cellulose fleece permeable to air and is provided on the rear side thereof, and an adjoining plastic layer that preferably adjoins the barrier layer and that is produced by back foaming. This structure eliminates the need for a barrier film between the decorative layer and the back foamed plastic layer.

BRIEF DESCRIPTION OF THE DRAWINGS

Further features and advantages of the invention will be apparent from the following description and the drawings in which:

FIG. 1 is a cross-sectional view through a section of a vehicle interior lining according to the invention in the form of a roof liner, FIG. 2 is an enlarged view of the barrier layer used in the a interior lining and FIG. 3 is a cross-sectional view through a vehicle interior lining according to a second embodiment of the invention.

DETAILED DESCRIPTION OF THE PREFERRED EMBODIMENT

FIG. 1 illustrates in cross-section a portion of a vehicle interior lining in the form of a roof liner as a part of an entire roof module. The vehicle interior lining has a large surface area and is structured as shown in FIG. 1 in the cross-section across the entire or virtually the entire surface. Toward the vehicle interior space, only a decorative layer 10 formed of a cloth permeable to air or an air-permeable imitation leather is visible. Directly adjoining a rear side of the decorative layer 10 is a barrier layer 12 of open-cell foam. Directly adjoining the rear side of the barrier layer 12 is again a foamed layer 14 which consists of polyurethane (PU) material and is directly applied to the barrier layer 12 by a back foaming process.

The microscopic enlarged view of the barrier layer 12 illustrated in FIG. 2 shows the open-cell structure of this foamed material forming the barrier layer 12.

The method of producing the vehicle interior lining will be described below. At first, the decorative layer 10 and the barrier layer 12 are bonded to each other to form an intermediate product; this can be done by means of laminating or gluing. Afterwards, this intermediate product is placed in a foaming mold, and liquid PU material is introduced onto the rear side for providing the intermediate product with a foam backing.

The thickness of the barrier layer 12, the cell size and the openings in the cells are chosen such that no liquid PU material can penetrate the barrier layer 12 completely during back foaming. This prevents the liquid PU material from reaching the decorative layer 10; thus, there is no risk that the PU material will appear on the outside of the decorative layer 10.

Because there is no barrier film in the inventive interior lining structure and because the entire interior space lining is permeable to air as a whole, the interior space lining has a high sound absorption ability. The arrows shown in FIG. 1 represent impinging and partially reflected sound waves against the interior lining.

Further, the barrier layer 12 is designed to be soft and flexible to be pleasing to the touch. Thus, additional laminating is unnecessary to achieve this softness.

The embodiment according to FIG. 3 is largely identical in terms of its structure and its method of producing to the one explained above. Similar elements between the two embodiments will have the same reference numerals.

In this embodiment, a fiber mat 16 is provided on the rear side of the interior lining for enhancing the stability of the interior lining and for easier mounting to an adjoining vehicle component (e.g. the remainder of the roof module). This fiber mat 16 is either fastened to the rear side of the foamed layer 14 or is likewise placed in the foaming mold and hence embedded in the foamed layer 14.

As an alternative, the fiber mat 16 may be dispensed with and instead of a mat, fibers (such as glass fibers) can be introduced in the foamed layer 14 during the foaming process, for example in so-called LFI (Long Fiber Injection) methods. In this case, the barrier layer 12 should be engineered to prevent any penetration of the injected fibers to the decorative layer 10.

Instead of a glass fiber mat or glass fibers, it is also possible to provide a natural fiber mat, any other artificial fiber mat, or fibers of any material without departing from the scope of the invention.

A so-called spacer 18 may also be embedded in the foamed layer 14. The spacer 18 maintains a specific distance between the fiber mat 16 and the barrier layer 12 during formation of the foamed layer 14. The spacer 18 preferably has a spring or resilient action.

In FIG. 3, the spacer 18 is shown schematically as a double wavy line. The spacer 18 may be comprised of, for example, a plastic mat whose open cellular structure forms an irregular spatial grid which, judging by appearance, is similar to an osteoporosis bone structure. Preferably, the spacer 18 is a PU polyester foamed in a nitrogen atmosphere and having a low initial density of 20 kg/m$^3$ when foamed, a compression hardness of approximately 20 kPa, a cell number of about 13 cells per cm$^3$, a tensile strength of about 230 kPa and an elongation at break of approximately 70%.

After having produced the intermediate product (i.e., the decorative layer 10 and the barrier layer 12), the intermediate product and the spacer 18 as well as the fiber mat 16 are placed in the foaming mold and brought in position therein.

The positioning can be carried out, for instance, in the upper mold half and by means of a tensioning frame so that the barrier layer 12 is situated at the side of the upper mold half facing the lower mold half. As a next step, the water-like liquid PU plastic mass, which has been mixed thoroughly in a mixing head, is applied to the fiber mat 16. The liquid plastic mass instantly infiltrates the fiber mat 16 and the spacer 18 and directly contacts and partially penetrates the barrier layer 12. The upper mold half of the foaming mold is then laid on the lower mold half and the foaming mold is tightly sealed. Due to its elastic properties, the spacer 18 in combination with the displacement forces of the expanding plastic foam ensures that the optionally patterned surfaces of the mold halves will be reproduced. When a selected reaction time is over, the foaming mold is opened and the resultant one-piece vehicle interior lining is taken out of the foaming mold.

As discussed above, it is important that the liquid plastic can penetrate the spacer 18 without any problems so that during the back foaming process, the foam produced for the foamed layer 14 brings about a connection between the barrier layer 12, the fiber mat 16 and the spacer 18.

For a simplified installation of the vehicle interior lining it is possible to embed fastener 20 (for example latching elements, eyes, hooks etc.) in the foamed layer 14 during foaming.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method of producing a vehicle interior lining comprising:

forming an intermediate product having a decorative layer and an open-cell foam barrier layer, the open-cell foam barrier layer adjoining a rear side of the decorative layer; and providing a foam backing to a rear side of the intermediate product by a back foaming process that includes applying a liquid plastic to the open-cell foam barrier layer, wherein the open-cell foam barrier layer blocks the liquid plastic to prevent the liquid plastic from penetrating the open-cell foam barrier layer toward the decorative layer wherein the vehicle interior lining is permeable to air.

2. The method according to claim 1, wherein forming the intermediate product comprises gluing the open-cell foam barrier layer and the decorative layer to each other.

3. The method according to claim 1, wherein forming the intermediate product comprises laminating the open-cell foam barrier and the decorative layer together.

4. The method according to claim 1, wherein a fiber mat is applied to a rear side of the foam backing produced during the back foaming process.

5. The method according to claim 1, wherein a fiber mat is embedded in the liquid plastic during the back foaming process.

6. The method according to claim 1, wherein the liquid plastic is directly applied to the open-cell foam barrier layer and comes into contact with the open-cell foam barrier layer during the back foaming process.

7. The method according to claim 1, further comprising introducing fibers into the liquid plastic during the back foaming process, wherein the fibers are distributed in the foam backing formed by the back foaming process.

8. The method according to claim 7, wherein the fibers are glass fibers introduced into the liquid plastic via a Long Fiber Injection process.

9. The method according to claim 1, further comprising embedding at least one of a fastener and a spacer in the liquid plastic during the back foaming process.

10. The method according to claim 1, wherein the liquid plastic is polyurethane.

11. The method according to claim 1, wherein the decorative layer is one selected from a group consisting of a textile material, a leather material, and an imitation leather material.

12. The method according to claim 1, wherein the open-cell foam barrier layer is permeable to air.

13. The method according to claim 1 wherein the open-cell foam barrier layer comprises a soft layer such that the intermediate product of the decorative layer and open-cell foam barrier layer cooperate to provide the vehicle interior lining with a soft touch exterior surface.

14. A method of producing a vehicle interior lining comprising:
    joining a decorative layer and a barrier layer together to form an intermediate product wherein the decorative layer comprises an air-permeable material and the barrier layer comprises an open-cell foam that is air-permeable;
    back foaming a foam layer onto one side of the intermediate product by applying a liquid plastic to the barrier layer;
    blocking the liquid plastic with the barrier layer to prevent the liquid plastic from penetrating the barrier layer and contacting the decorative; and
    wherein the barrier layer of the open-cell foam comprises a soft layer such that the intermediate product of the decorative layer and barrier layer cooperate to provide the vehicle interior lining with a soft touch exterior surface with the vehicle interior lining being permeable to air.

15. The method according to claim 14 including positioning the barrier layer intermediate the decorative layer and the foam layer such that the barrier layer directly contacts both the decorative layer and the foam layer.

16. The method according to claim 14 including attaching a fiber mat directly to the foam layer.

17. The method according to claim 16 including embedding a spacer within the foam layer to maintain a predetermined distance between the fiber mat and the barrier layer during back foaming.

18. The method according to claim 14 including injecting a plurality of fibers into the foam layer during back foaming and blocking the plurality of fibers with the barrier layer to prevent the plurality of fibers from penetrating the decorative layer.

19. The method according to claim 14 wherein the decorative layer forms a vehicle interior surface with the barrier layer being positioned between the vehicle interior surface and a vehicle roof component.

* * * * *